United States Patent Office 2,723,986
Patented Nov. 15, 1955

2,723,986

TRICHLOROVINYL ORGANOSILICON COMPOUNDS

John W. Gilkey, Midland, Mich., assignor to Dow Corning Corporation, Midland, Mich., a corporation of Michigan No Drawing. Application November 17, 1952,
Serial No. 321,058

10 Claims. (Cl. 260—448.2)

This invention relates to organosilanes and siloxanes having a trichlorovinyl radical attached to the silicon.

In general, it has been found that a chlorine atom, beta to the silicon atom of a silane, is unstable. Thus, for example, beta-chloroethyltrichlorosilane has four hydrolyzable chlorine atoms.

It has further been shown that polychlorinated radicals attached to silicon atoms are unstable. Thus, for example, the trichloromethyl group in trichloromethylsilanes is unstable to moisture. It has now been found that in trichlorovinylsilanes the beta-chlorines are hydrolytically stable.

It is the object of this invention to produce a silane having therein a polychlorinated radical which is stable to moisture.

This invention relates to silanes of the formula $(CCl_2=CCl)_nR_mSiCl_{4-(n+m)}$ where R is a monovalent hydrocarbon radical, n has a value from 1–2 inclusive, m has a value from 1 to 3 inclusive, and the sum of $m+n$ is not greater than 4.

Thus it can be seen that this invention relates to trichlorovinylchlorosilanes having 1 or 2 trichlorovinyl groups attached to the silicon. Those silanes having 1 trichlorovinyl group are best prepared by reacting tetrachloroethylene with trichlorosilane under pressure at a temperature from 250–350° C. The silanes having 2 trichlorovinyl groups attached to the silicon are best prepared by reacting dichlorosilane with tetrachloroethylene under the above conditions. Silanes containing an R group may be prepared by reacting a silane of the formula RSiHCl₂ with tetrachloroethylene. This latter reaction is especially suitable when only one R group is present in the molecule.

An alternative method for preparing silanes containing R groups is by employing the well-known Grignard method. This is the more flexible method because any number of R groups may be substituted on the silicon and because combinations of various R groups may be substituted. For example, 1 mol of trichlorovinyltrichlorosilane may be reacted with up to 3 mols of phenyl magnesium chloride to produce silanes having 1 to 3 phenyl groups in the molecule. Alternatively one may employ a mixture of various Grignard reagents in order to substitute different R groups in the silane.

For the purpose of this invention, R may be any monovalent hydrocarbon radical, such as, for example, alkyl, alkenyl, alkinyl, cycloaliphatic, aryl, alkaryl, and aralkyl radicals.

This invention further relates to siloxanes having the unit formula

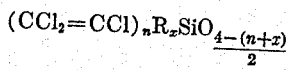

where R and n are as above defined and x has a value from 1 to 2 inclusive, and where the sum of $n+x$ is not greater than 3. These siloxanes may be prepared by hydrolyzing the corresponding trichlorovinylchlorosilanes. The hydrolysis may be carried out in the usual manner for hydrolyzing chlorosilanes. In general, it is preferable to employ a solvent such as ether, toluene or the like. It is to be understood that the siloxanes disclosed and claimed herein may contain silicon bonded OH groups.

The siloxanes of this invention are stable materials which are useful as protective coatings, electrical insulation and other uses for which organosiloxanes are normally employed.

The following examples are illustrative only and should not be construed as limiting the invention which is properly set forth in the appended claims.

Example 1

813 g. of trichlorosilane and 747 g. of tetrachloroethylene were heated together in an autoclave for 16 hours at 296–316° C. During this time the pressure varied from 1075 to 1490 p. s. i. The products were then distilled and after removal of unreacted tetrachloroethylene and by-produced silicontetrachloride, trichlorovinyltrichlorosilane was obtained boiling at 93° C. at 30 mm.

Upon hydrolysis of this material, a viscous fluid was obtained which, upon heating at 100° C., changed to a brittle resin. This resin was the polysiloxane having the unit formula $CCl_2=CClSiO_{1.5}$.

Example 2

690 g. of methyldichlorosilane and 498 g. of tetrachloroethylene were heated for 16¼ hours at 297–310° C. During this time the pressure varied from 1025 to 1600 p. s. i. The product was then distilled and after removal of unreacted methyldichlorosilane and tetrachloroethylene and by-produced methyltrichlorosilane, trichlorovinylmethyldichlorosilane was obtained boiling at 94–96.5° C. at 30 mm.

Upon hydrolysis of this material, a fluid polysiloxane was obtained which had the unit formula

Example 3

When dichlorosilane and tetrachloroethylene are reacted in the ratio of one mol of the former to two mols of the latter under the conditions of Example 1, bistrichlorovinyldichlorosilane is obtained.

Upon hydrolysis of this material, a liquid polysiloxane having the unit formula $(CCl_2=CCl)_2SiO$ is produced.

Example 4

When one mol of trichlorovinyltrichlorosilane is reacted with one mol of phenyl magnesium bromide in diethylether, a mixture of trichlorovinylphenyldichlorosilane and trichlorovinyldiphenylchlorosilane is obtained.

Upon hydrolysis of this mixture, an oily copolymeric siloxane having the structural formula $(C_6H_5)_2CCl_2=CClSiO[C_6H_5(CCl_2=$
$CCl)SiO]_nSiCCl=CCl_2(C_6H_5)_2$ where n is an integer, is obtained.

That which is claimed is:

1. A silane of the formula

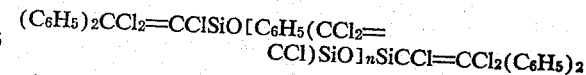

where R is a monovalent hydrocarbon radical, n has a value from 1–2, m has a value from 1 to 3, and the sum of $n+m$ is not greater than 4.

2. A silane in accordance with claim 1 where R is methyl.

3. A silane in accordance with claim 1 where R is phenyl.

4. A polysiloxane having the unit formula

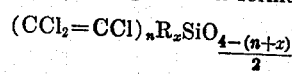

where R is a monovalent hydrocarbon radical, $n$ has a value from 1–2, $x$ has a value from 1 to 2, and the sum of $n+x$ is not greater than 3.

5. A siloxane in accordance with claim 4 where R is methyl.

6. A siloxane in accordance with claim 4 where R is phenyl.

7. A silane in accordance with claim 1 where $m$ has a value of 1.

8. A silane of the formula $(CCl_2=CCl)RSiCl_2$ where R is a monovalent hydrocarbon radical.

9. A siloxane in accordance with claim 4 where $x$ has a value of 1.

10. A siloxane of the unit formula $(CCl_2=CCl)RSiO$ where R is a monovalent hydrocarbon radical.

References Cited in the file of this patent

UNITED STATES PATENTS 2,512,390   Sommer _____ Jan. 20, 1950

OTHER REFERENCES

Agre: "Jour. Am. Chem. Soc.," vol. 71 (1949), pages 300–304.

Wagner et al.: "Jour. Am. Chem. Soc.," vol. 71, pages 3567–8 (1949).

Agre et al.: "Jour. Am. Chem. Soc.," vol. 74 (1952), pages 3895–3898.

Agre et al. "Jour. Am. Chem. Soc.," vol. 74 (1952), pages 3899–3902.